United States Patent Office 3,407,058
Patented Oct. 22, 1968

3,407,058
PROCESS FOR PRODUCING METALLIC IRON FROM HYDRATED OXIDIC IRON ORES
C F Gray, Baton Rouge, and Sebastian Marc Laurent, Greenwell Springs, La., assignors to Esso Research and Engineering Company, a corporation of Delaware
No Drawing. Filed May 7, 1965, Ser. No. 454,204
13 Claims. (Cl. 75—26)

ABSTRACT OF THE DISCLOSURE

A process for suppressing decrepitation in the reduction of hydrated iron ore to substantially metallic iron comprising the steps of (1) preheating the hydrated iron ore at temperatures ranging from about 150° F. to about 585° F. in a reducing atmosphere to partially reduce the ore to substantially ferrous oxide without driving off the waters of hydration, this step being followed by (2) elevation of the temperature to, e.g., 1200–1800° F., and completion of the reduction to produce substantially metallic iron. In a specific embodiment, goethite, i.e., $Fe_2O_3 \cdot H_2O$, is reduced in the initial preheat step to $FeO \cdot H_2O$, this step being followed by completion of the reduction to substantially metallic iron.

---

This invention relates to the production of metallic iron by contact of particulate ore with reducing gases. In particular, it relates to an improved iron ore reduction process wherein fluidized iron ores, particularly oxidic iron ores, are metallized by direct contact with hydrogen, carbon monoxide, or mixtures of these and other gases.

It is known to produce metallic iron by reduction of, e.g., oxidic iron ores. Oxidic ores, i.e., ores containing or consisting essentially of oxides of iron, are fluidized in beds by ascending gases, at temperatures ranging generally from about 1200° F. up to the sintering temperature of the ore, the sintering temperature for most ores being generally about 1800° F. In such processes, the fluidized iron ore solids are often staged in separate beds or reduction zones, and the zones operated at the same or at different elevated temperatures. In such process, a particulate raw ore is generally fed into the top fluidized bed of the reactor and gradually reduced as the ore is passed downwardly from one bed to the next. In a typical process, ferric oxide is reduced, e.g., in a first zone to magnetic oxide of iron or to a mixture of oxides approximating the $Fe_3O_4$ formula. In a subsequent bed, or beds, the magnetic oxide of iron is reduced substantially to ferrous oxide; and in an adjacent bed, or beds, the ferrous oxide is reduced to a metallized product ranging generally from about 85 to about 95 percent metallic iron.

The reducing gases supplied to such process are generally externally generated. This means, e.g., that a hydrocarbon is reacted in a steam reforming reaction to produce carbon monoxide and hydrogen and the mixture of gases then fed into the direct iron ore reduction reaction. Sometimes hydrogen is separated from the mixture and used in very high concentration in the process. In certain other processes, a hydrocarbon is fed directly into the process so that the reducing gases are generated internally. The latter is generally referred to as direct injection.

A problem in all such processes is to supply sufficient heat for the reaction to proceed. This is particularly true in the direct injection process. In such processes, the ore and gas feed is generally preheated to supply the necessary heat of reaction to the process. In such processes it is common procedure to heat the gas and ore to a very high degree to supply as much heat as possible to the reaction. With many ores, this technique proves quite feasible.

There are certain other ores, however, which can hardly be subjected to such treatment, if at all, without the introduction of serious process difficulties, including, e.g., iron ore losses, cyclone inefficiencies, poor fluidization and the like. Such ores are the hydrated forms of ore, e.g., goethite $Fe_2O_3 \cdot H_2O$. These ores, some of which may contain multiple waters of hydration, decrepitate severely when heated.

Decrepitation is a phenomenon manifested by the production of an excessive amount of "fines," i.e., small particles generally ranging, e.g., from about 0.5 micron and smaller to about 44 microns (particles passing through 325 mesh in the Tyler series). These fines, generated in the process from larger particles of ore, are produced by the tearing apart of the larger particles as a result of the bound water of hydration escaping from the crystalline structure of which the ore is composed.

As a result of this phenomenon, there are a wide variety of hydrated iron ores, particularly the hydrated forms of oxidic iron ores, which are entirely unsuitable for use in the direct iron ore reduction process. In the present era of diminishing iron ore reserves, and the increasing demand for iron to produce steel, it becomes highly desirable, if not imperative, to utilize all available sources of iron ore for the production of iron.

Accordingly, the primary objective of the present invention is to make available a new and improved process which will utilize low grade hydrated iron ores. In particular, the objective of the invention is to provide a process which will obviate the problem of decrepitation of hydrated ores. A particular objective is also to provide the art with a simplified, new and novel fluidized iron ore reduction process wherein decrepitation is minimized and, in some cases, completely eliminated, particularly in a process wherein oxidic iron ores can be treated with a reducing gas, or gases, to provide metallic iron via successively reducing the iron oxides to lower stages of oxidation. A specific object is to provide a process utilizing a series of staged reaction zones wherein direct hydrocarbon injection is employed, and also a process wherein a significant portion of hydrogen is used as the reducing gas.

These and other objects are achieved in accordance with the present invention which contemplates a preheat reduction of particulate hydrated iron ores, especially hydrated oxidic iron ores, at temperatures ranging from about 150° F. up to about 585° F., and preferably from about 200° F. to about 450° F., followed by a completion of the reduction at higher temperatures. Pursuant to such preheat reduction, decrepitation of the particulate ore is greatly minimized. Preferably, also, in conducting the preheat reduction reaction the ore is subjected to supra atmospheric conditions, preferably elevated pressure conditions ranging from about 2 atmospheres to about 15 atmospheres, and more preferably from about 5 to about 10 atmospheres. The use of supra atmospheric pressures further lessens decrepitation, greatest benefits being achieved within the preferred ranges.

In accordance with the present invention a particulate hydrated oxidic iron ore, preferably in fluidized state, is subjected to an increasing temperature profile which includes one or more preheat reduction steps. The preheat step, or steps, is imposed in a reducing atmosphere and calls for application of a temperature which is sufficient to partially reduce the iron ore but insufficient to cause removal of bound water from the crystallite structure. Following the preheating step, or steps, the temperature of the ore can be brought up to the normal processing temperature—viz., from about 1200° F. to about 1800° F.—and the reduction completed or continued until the ore is reduced substantially to metallic iron. Surprisingly, however, the decrepitation which occurs in completing the reduction is far less than would have been produced if the preheat treatment had been eliminated.

The reasons for the effectiveness of this technique in treating particulate ores to lessen decrepitation are not understood. Thus, in the preheat reduction step in accordance with the invention, e.g., in treating goethite, $Fe_2O_3 \cdot H_2O$, the ferric oxide or $Fe_2O_3$ portion of the crystalline structure is reduced substantially to ferrous oxide or FeO, but the originally bound water of hydration remains associated with the FeO. In other words, $Fe_2O_3 \cdot H_2O$ is reduced to $FeO \cdot H_2O$ or ferrous hydroxide. Only in the subsequent reduction at higher temperatures is the bound water of hydration released and the FeO further reduced. Surprisingly, however, the reduction of the $FeO \cdot H_2O$ at normal temperatures is accompanied by far less decrepitation than would have occurred if the $Fe_2O_3 \cdot H_2O$ has been treated ab initio at the higher temperature. This is quite surprising for, inter alia, proportionately more water is present, on a weight basis, than in the original crystallite structure. In any regard, the fracturing of the crystallite produced by release of the bound water has far more harsh consequences in the original orthorhombic $Fe_2O_3 \cdot H_2O$ structure than in the resultant $FeO \cdot H_2O$ structure produced during the low-temperature reduction. The discovery is all the more intriguing because low temperature treatment of $FeO \cdot H_2O$ per se in a non-reducing atmosphere results in high decrepitation.

In the best method of practicing the present invention, oxidic ore hydrates or iron oxide hydrate solids particles are contacted with upwardly flowing reducing gases, especially hydrogen-containing gases, and the ore solids particles fluidized in a plurality of beds or staged zones. The zones, containing fluidized beds operated at varying temperatures, contain ore at different stages of reduction. The solids are gravitated from one zone to the next countercurrent to the direction of flow of the gases.

In such process the reducing zones operated at normal temperatures, ranging generally from about 1200° F. to about 1800° F., are preceded by one or more low temperature fluidized reduction zones. These latter zones are operated by contact of the ore with the reducing gases at temperatures sufficient to reduce a hydrated iron oxide to a hydrated FeO form, but insufficient to cause any substantial release of the bound waters of hydration. Thus, it is contemplated that such zone, or zones, will be operated at temperatures ranging from about 150° F. to about 585° F., and preferably from about 200° F. to about 450° F. Preferably, also it is contemplated that the zones will be operated at supra atmospheric pressure, preferably ranging from about 2 to about 15 atmospheres, and more preferably from about 5 to about 10 atmospheres. Generally, employing supra atmospheric pressures in the preferred range will result in equivalent efficiencies when the higher pressure is associated with the lower temperature in the designated range and vice versa.

The following non-limiting examples and pertinent demonstrations bring out the more salient features and provide a better understanding of the invention.

A large quantity of raw $Fe_2O_3 \cdot H_2O$ ore containing some physically absorbed water was pulverized in a ball mill, and divided into several like portions. This type of oxidic ore, known as goethite, is one well known as possessing a severe tendency to decrepitate.

Portions of the ore were charged into a fluidized iron ore reactor. In the initial examples and demonstration which follow, the reactor housed a reduction process providing a single fluidized zone, and in such process the ore was fluidized by an upwardly flowing reducing gas mixture initially 60 percent hydrogen and 40 percent nitrogen.

In the selected examples, the ore fed into the reactor was heated in a single preheat reduction step. The preheat reduction step was then followed by elevation of the temperature and reduction under more drastic conditions. Following the examples, for purposes of comparison, demonstrations are also given wherein the initial preheat reduction step was not applied; i.e., the fluidized ore was subjected ab initio to reduction at the high temperature.

In the comparative data, it will be observed that decrepitation is drastically reduced by the use of a temperature profile history which includes an initial preheat reduction step. In fact, in the selected data set forth below, it will be noted that decrepitation in such instance is reduced by as much as 500 percent or greater.

Example 1

A portion of the finely divided goethite ore was subjected to preheat treatment at atmospheric pressure with a 60:40 hydrogen:nitrogen mixture. A four-hour hold-up time wherein the temperature ranged from about 150° F. gradually heating up to about 450° F. was provided. The goethite was reduced largely to $FeO \cdot H_2O$. At the end of this period, the temperature of the reducing gas mixture was rapidly elevated to 1300° F. and reduction continued for 1.3 hours to produce over 90 percent metallization. Analysis of the contents of the reactor showed that only 3.2 percent of the original particles of iron ore had been reduced to fines, i.e., particles of size ranging 44 microns or smaller.

In sharp contrast, however, when the foregoing reaction is conducted under identical conditions except that the preheat step was omitted, it was found that decrepitation, or fines production, was 16.5 percent. In other words, of the iron ore solids particles present in the reactor, 16.5 percent were reduced to particle sizes ranging 44 microns and smaller. Thus, decrepitation was more than 500 percent greater than where the reduction was preceded by the single preheat step.

Example 2

When the foregoing example was repeated, except that the preheat was very gradually or incrementally applied up to a temperature of 585° F. over a period of about four hours to convert the $Fe_2O_3 \cdot H_2O$ substantially to $FeO \cdot H_2O$ and the temperature then raised to 1300° F. and reduction completed, decrepitation was less than one percent.

In contrast, even when the foregoing run was repeated with only an inert nitrogen gas preheat wherein the temperature was raised to only 375° F. over two hours, the decrepitation was found to be 2.6 percent; and when, during the same period the temperature was raised to 620° F., decrepitation was found to be seven percent.

Demonstrations show that at temperatures below about 585° F. in a nonreducing atmosphere, decrepitation is substantial, and when the 585° F. is exceeded, decrepitation further increases. In contrast, however, in preheat reduction at temperatures at or about 230° F., the amount of decrepitation is very low, and does not increase substantially until the temperature of about 585° F. is exceeded. Temperatures below about 150° F. are generally considered impractical for preheat reduction because of the inordinately long period of time required to effect the initial reduction step.

Example 3

A portion of the ore is charged into a fluidized iron ore reactor wherein is provided a series of four staged fluidized zones, two preheat reduction zones followed by two ferrous reduction zones. The ore is fluidized by an ascending gas initially sixty percent hydrogen and forty percent nitrogen. The gas flows from a zone containing an iron ore at a lower level of oxidation to the next higher level of oxidation, i.e., from the bottom to the top of the reactor. The column is operated at a pressure of 100 pounds per square inch gauge. The ore is introduced into the first preheat zone and moves from the top to the bottom of the reactor and from one stage of reduction to the next. The preheat zones are operated at 200° F. and at 375° F., respectively, and sufficient hold-up time is permitted to substantially reduce the $Fe_2O_3 \cdot H_2O$ to $FeO \cdot H_2O$ prior to or at the time the ore is gravitated from the second preheat zone downwardly to the first of the ferrous reduction stages. The ferrous reduction stages, wherein ferrous oxides are reduced essentially to metallic iron, are operated at 1300° F. In the last ferrous reduction zone, ferrous oxide is reduced to provide 94 percent metallization.

Pursuant to operating at such conditions, there is no significant amount of decrepitation and the process operates smoothly and efficiently.

It is apparent that changes and modifications can be made in the present process without departing the spirit and scope of the invention.

A prime feature of the invention resides in the use of a deliberate preheat reduction step, or steps, which partially reduces a hydrated iron ore without substantial release of the waters of hydration. This contemplates, generally, reduction of the iron ore to the ferrous state. Following this preheat treatment, reduction is completed at a higher temperature to produce metallization of the oxide, as well as release of the waters of hydration.

The hydrated iron oxide ores treated in accordance with this invention include, e.g., the family of hydrated iron ores referred to as limonite, including goethite, lepidocrocite, akaganéite and the like. The ores can be substantially one hundred percent of the hydrated form or can be admixed with other ores, or with other hydrated ores.

Having described the invention, what is claimed is:

1. In a process for the production of metallic iron from hydrated oxidic iron ores wherein iron ore particulate solids are fed into the process, contacted with gas, and reduced, the improvement comprising imposing a temperature profile wherein the ore is preheated and reduced to substantially ferrous oxide at an initial temperature ranging from about 150° F. to about 585° F. in a reducing atmosphere without substantial release of the waters of hydration therefrom, and completing the reduction to iron in a fluidized bed at a temperature ranging from about 1200° F. to about 1800° F.

2. The process of claim 1 wherein the ore is preheated at temperatures ranging from about 200° F. to about 450° F.

3. The process of claim 1 wherein supra atmospheric conditions are employed throughout the reaction.

4. The process of claim 3 wherein the pressure ranges from about 2 atmospheres to about 15 atmospheres.

5. In a process for the production of metallic iron from hydrated oxidic iron ores wherein iron ore particulate solids are fed into the process and fluidized by a stream of gas within a series of staged zones containing fluidized beds, including a preheat reduction zone and a ferrous reduction zone, and reduced at elevated temperatures, the improvement comprising imposing a temperature profile wherein the ore is heated in the preheat zone at an initial temperature ranging from about 150° F. to about 585° F. and reduced to substantially ferrous oxide without substantial release of the waters of hydration therefrom, and then transferring the partially reduced ore to a ferrous reduction zone and completing the reduction at a temperature ranging from about 1200° F. to about 1800° F.

6. The process of claim 5 wherein the reaction is conducted at temperatures ranging from about 200° F. to about 450° F.

7. The process of claim 5 wherein supra atmospheric conditions are employed throughout the reaction.

8. The process of claim 7 wherein the pressure ranges from about 2 atmospheres to about 15 atmospheres.

9. In the process for the production of metallic iron by direct reduction of particulate hydrated oxidic iron ores, the combination comprising fluidizing the iron ore solids particles with upwardly flowing hydrogen-containing gases, providing a plurality of staged, fluidized preheat and ferrous reduction zones, heating the iron oxide solids initially in the preheat zone at temperatures ranging from about 150° F. to about 585° F. to reduce same to substantially ferrous oxide without substantial release of the waters of hydration, passing the ferrous oxide to the ferrous reduction zone and heating same to a temperature ranging from about 1200° F. to about 1800° F., and then withdrawing a metallized iron product.

10. In the process for the production of metallic iron by direct reduction of particulate goethite ore the combination comprising fluidizing the iron ore solids particles with upwardly flowing hydrogen-containing gases in a series of staged zones including preheat and ferrous reduction zones, preheating the iron oxide solids in a preheat zone at temperatures ranging from about 150° F. to about 585° F. sufficient to reduce the ore substantially to ferrous oxide without substantial release of the waters of hydration therefrom, passing the ferrous oxide to the ferrous reduction zone and heating same to a temperature of from about 1200° F. to about 1800° F., and withdrawing a product which is from about 85 to about 95 percent metallized.

11. The process of claim 10 wherein the ore is preheated at temperatures ranging from about 200° F. to about 450° F.

12. The process of claim 10 wherein supra atmospheric conditions are employed.

13. The process of claim 12 wherein the pressure upon the reaction ranges from about 2 atmospheres to about 15 atmospheres.

References Cited
UNITED STATES PATENTS

| | | | |
|---|---|---|---|
| 2,965,449 | 12/1960 | Jukkola | 75—26 |
| 3,126,276 | 3/1964 | Marshall et al. | 75—26 |
| 3,205,065 | 9/1965 | Mayer et al. | 75—26 |
| 3,210,180 | 10/1965 | Jukkola | 75—26 |

L. DEWAYNE RUTLEDGE, *Primary Examiner.*